Patented Jan. 18, 1938

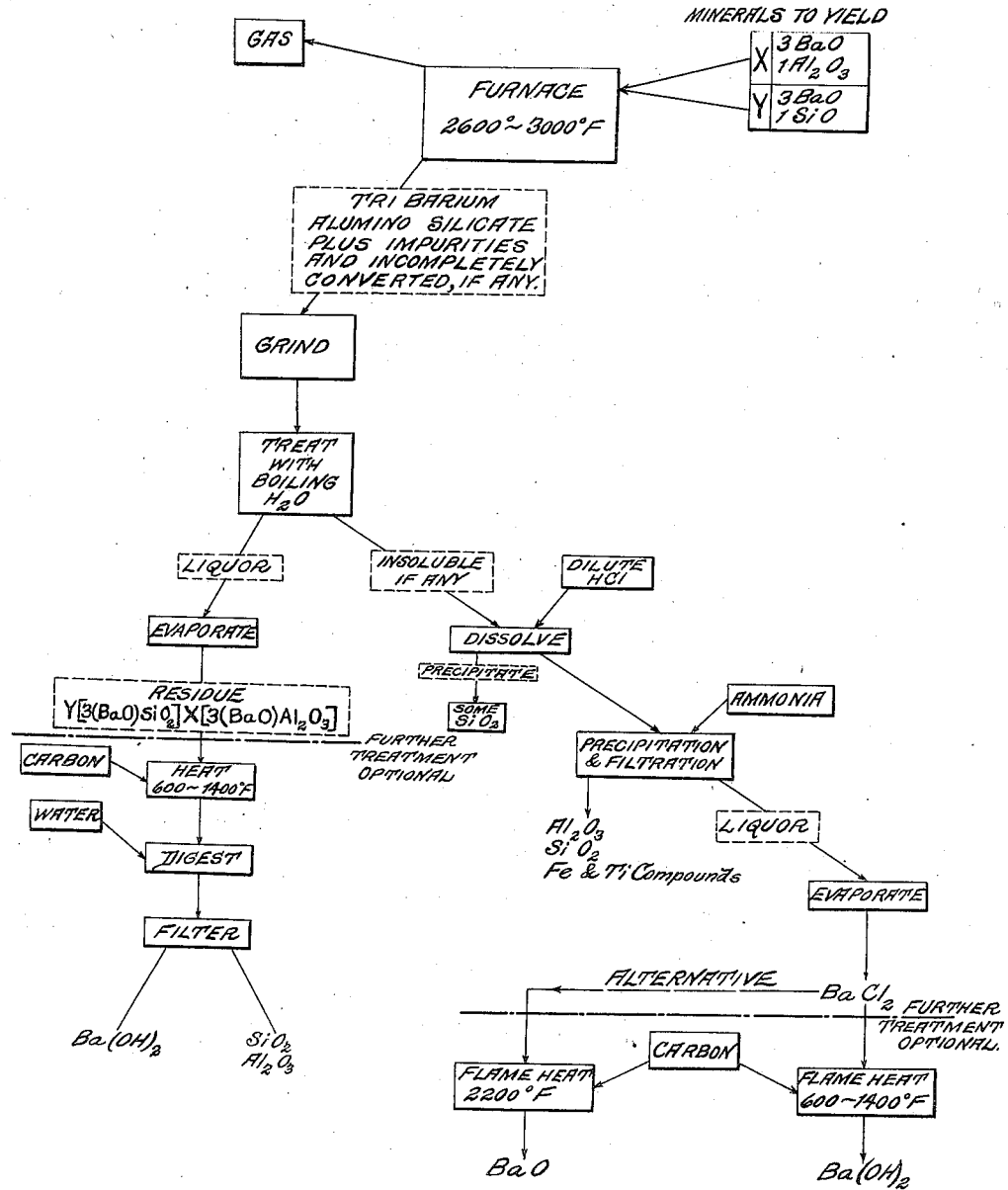

2,105,940

UNITED STATES PATENT OFFICE 2,105,940

MANUFACTURE OF BARIUM COMPOUNDS

Elbert E. Fisher, St. Louis, Mo.

Application March 28, 1936, Serial No. 71,447

12 Claims. (Cl. 23—52)

This invention relates generally to the manufacture of barium compounds and particularly to a process of producing water soluble barium salts as well as the treatment and employment thereof.

Barium occurs in nature frequently as a barium sulphate ore known as barytes or tiff, and heretofore the barium sulphate ore has been treated so as to produce other compounds of barium such, for instance, as barium sulphide, impure barium oxide, barium silicate, etc. A series of barium silicates have heretofore been known, it being recognized that certain of the silicates, for instance, monobarium silicate, is insoluble in water, whereas tribarium silicate is rather soluble in water. Dibarium silicate has also been referred to in the literature, but that silicate, for practical purposes, may be regarded as a mixture of monobarium silicate and tribarium silicate, it being only partially soluble in water. Compounds of barium and aluminum, for instance, barium aluminate, are also known. Some difficulty has heretofore been experienced, however, in the production of water soluble barium compounds substantially free from sulphur upon an economical basis.

The object of the present invention generally stated is to provide a process of treating barium sulphate ore whereby to produce a substantially water soluble product substantially free from soluble sulphur.

Another object of the invention is to produce a water soluble compound or complex of barium oxide, alumina, and silica.

A further object of the invention is to provide a process of obtaining water soluble barium compounds from an insoluble barium containing furnace product.

A more specific object of the invention is to provide an economical process of treating barium sulphate ore and a furnace product obtained therefrom so as to secure a high yield of soluble barium compounds without excessive cost.

Other objects will become apparent to those skilled in the art when the following description is read.

The drawing is a flow sheet diagrammatically illustrating the successive steps involved in the practice of the process according to one embodiment.

In accordance with the present invention a barium sulphate ore such, for instance, as barytes or tiff may be treated in a furnace with such proportions of other minerals containing alumina and silica that the reaction products of barium and silica will be in the form of a water soluble product to a large extent, the remainder being subject to treatment in accordance with one phase of the present invention whereby to convert it into water soluble barium compounds. According to the present invention, the minerals employed as the raw material for the process may be analyzed so as to determine the amounts of barium alumina and silica present there in and mixed in such proportions that the barium-alumina reaction product will be in the form of tribarium aluminate and the barium silica reaction product will be in the form of tribarium silicate. While it will be understood that the present invention may be carried out under conditions such as to yield substantially all of the barium aluminates and silicates in the form of tri salts, it is nevertheless to be understood that for some uses, complete conversion to this extent is not essential and, in other cases, while some of the reaction products may be initially insoluble in water, they may be treated according to another phase of the invention so as to convert them into water soluble compounds and hence, the present invention is not to be understood as limited to a process in which the barium reaction products are all in the form of tri salts.

When the process of the present invention is carried out under such conditions that complete conversion of the barium into tri salts of alumina and silica is not accomplished, the water insoluble portions may be subjected to further treatment as by treatment with an acid whose reaction product is soluble in water. For instance, hydrochloric acid may be employed so as to produce barium chloride. If other barium compounds are desired, however, the resultant barium chloride, and in some cases other impure barium compounds, may be subjected to a furnace treatment under reducing conditions so as to evolve the chlorine therefrom and produce a relatively pure barium oxide or hydrate which may, however, be contaminated with products absorbed from the lining of the furnace in which the treatment is carried out if high temperatures are employed.

In order to produce the maximum yield of water soluble barium compounds in the initial furnace product, the raw materials which may be barytes or tiff containing various proportions of silica and sometimes some alumina, may be employed with an alumina rich mineral such, for instance, as diaspore, burley, or bauxite. In either case in order to secure the maximum yield of soluble barium compounds, the minerals may be mixed in such proportions as to provide three molecules of barium oxide for each molecule of alumina and three molecules of barium oxide for each molecule of silica. The relative proportions of alumina to silica may be varied at will and consequently, the proportion of tribarium aluminate to tribarium silicate in the resultant product will likewise vary. For example, a low grade barytes ore which may contain a high percentage, for instance, about 18% silica, may be employed with a high grade alumina ore such, for instance, as bauxite. As another example, a high grade barytes ore containing only a low percentage of silica may be employed with a low grade of alumina ore containing a relatively high percentage of silica such, for instance, as diaspore or burley.

The raw materials mixed in stoichiometric proportions, as pointed out above, to produce a compound or complex composed of tribarium silicate and tribarium aluminate, and which will be termed herein as tribarium silico aluminate.

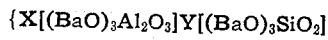
X and Y being variable} may be heated in a suitable furnace such, for instance, as a revolving type furnace or flash furnace to a temperature of 2600° to 3000° F. and that temperature maintained for time sufficient to accomplish the desired conversion. If neutral or oxidizing conditions are maintained, the sulphur contained in the barytes ore will be evolved and a vitrified product will result having a barium oxide content of 80 to 90 percent by weight depending upon the extent of conversion. The furnace treatment at this temperature may be continued for time sufficient to accomplish the desired conversion which may be ascertained by periodic sampling of the product in the furnace and testing the same for solubility. The period of time will also depend, to a large extent, upon the type of furnace employed and the quantity of charge undergoing treatment.

The raw materials in the furnace are reduced to a fused condition and when the conversion has been carried to the desired extent, may be poured from the furnace in the form of a slag or clinker. After cooling, this vitreous material may be suitably ground for subsequent treatment and if the furnace treatment has been carried to the maximum extent, the product will be substantially all soluble in water except for impurities such as iron and titanium which may have been present in the raw materials.

The ground furnace product may be treated with boiling water so as to separate the soluble from the insoluble constituents. In this case, the liquor apparently contains barium hydroxide, alumina, and silicic acid.

In order to recover the barium hydroxide from the liquor free of the other components, the liquor may be evaporated to dryness and the residue heated under reducing conditions as by mixing it with a small portion of carbon as for instance, one hundred, (100), parts of the residue to one or two parts of carbon at a temperature of 600° to 1400° F., for instance, 900° F. This treatment renders the silica and alumina present therein insoluble in water and consequently, upon further digestion in water, the silica and alumina may be removed by filtration, whereupon substantially pure barium hydroxide may be recovered by crystallization from the liquor.

It is to be understood, however, that for many practical purposes, the last described reducing treatment of the material need not be resorted to but the liquor obtained by solution of the initial furnace product, may be treated or itself employed in various industrial applications where the impurities present therein are not of consequence. For instance, the liquor may be treated with carbon dioxide gas resulting in the production of barium carbonate suitable for use in the ceramic industry. Furthermore, the liquor obtained by solution of the initial furnace product in water is particularly useful in the treatment of petroleum products, such as gasoline, containing mercaptans and other soluble sulphur compounds which have a deleterious influence upon the petroleum product. Treatment of the liquor just described, however, converts the mercaptans and reactable sulphur compounds in the petroleum product so that the sulphur content thereof precipitates apparently in the form of barium sulphate and may be removed by filtration or otherwise. Obviously the amount of liquor necessary for the treatment of a given petroleum product will depend entirely upon the proportion of mercaptans and reactable sulphur compounds present therein, but in any case, the amount required may be determined by determining the barium hydroxide content of the liquor and the content of reactable constituents in the petroleum product, and then using that quantity of liquor sufficient to furnish the amount of barium hydroxide stoichiometrically required for reaction with mercaptans, soluble sulphur compounds or other reacting compounds in the petroleum product.

While the initial furnace treatment may be carried to an extent such as to yield substantially all of the barium compounds in soluble form, it will be understood that, due to variation of the raw materials employed from the analyses thereof, or to inaccurate calculation or to lack of complete conversion in the furnace, some of the barium may be present in the furnace product in the form of water insoluble salts such for instance as monobarium silicate. In this case, the insoluble constituents may be filtered from the liquor obtained from the initial digestion of the furnace product in water. These insoluble constituents may, however, be dissolved in dilute hydrochloric acid using sufficient acid to react with the barium therein so as to produce barium chloride. Some silica is precipitated at this time. Separation of the alumina and remaining silica as well as such other impurities as may be present therein, for example iron and titanium, may be effected by treatment with a trace of ammonium hydroxide which produces a flocculent precipitate leaving substantially pure barium chloride dissolved in the liquor. The flocculent precipitate may be removed by filtration and the substantially pure barium chloride recovered by crystallization from the liquor.

If it is desired to produce barium oxide or barium hydrate from the barium chloride thus recovered, the barium chloride may be heated with carbon in order to evolve the chlorine. This may be accomplished by heating a charge of the barium chloride and carbon at a temperature of 600 to 1400° F. until the gases are all evolved. For instance, 12 parts of carbon may be employed to each 45 parts, by weight, of chlorine and the charge may be heated to 1400° F. with a reducing flame in which case the evolution of chlorine will be complete after the temperature has been maintained at about 1400° F. for 10 or 15 minutes in the case of small charges. In order to supply oxygen and hydrogen the reducing flame referred to is provided by the combustion of a hydrocarbon fuel, for example, oil or gas.

The gas evolved during this treatment has the characteristics of phosgene and the product resulting is substantially pure anhydrous barium hydroxide. If it is desired to carry the conversion further in order to produce barium oxide, the temperature may be elevated to about 2200° F. and there maintained for a period of 8 to 10 hours in which case the resultant product will be barium oxide, sufficiently pure to be employed in the manufacture of barium peroxide, but the product will usually be contaminated by a trace of constituents absorbed from the furnace lining.

The initial furnace product may be employed in various industrial applications without further treatment. As pointed out hereinbefore the liquor produced by the solution of the initial furnace product may be employed in the treatment of petroleum products such as gasoline or in other instances where it is desired, to remove from a liquid the dissolved sulphur content. Similarly the initial furnace product may be employed as a water softener, but it is to be noted that barium hydrate may be produced with sufficient economy in accordance with the present invention to enable its use in softening water.

The barium hydroxide may be produced in accordance with the present invention with sufficient cheapness to enable its employment in the manufacture of pigment materials. For instance, a double precipitate having highly advantageous properties for pigment purposes may be obtained by reaction of barium hydroxide with zinc sulphate in a water bath producing a double precipitate of barium sulphate and zinc hydroxide similar to but differing chemically from the lithopone of commerce.

From the foregoing description, it is apparent that the invention accomplishes its objects and provides a water soluble compound or complex of barium, alumina and silica in which the barium-silica reaction product as well as the barium alumina reaction product is in the form of the water soluble tri-salt. While, as pointed out hereinbefore, the relative proportions of the aluminate to the silicate may be varied in accordance with the product desired, in any event it is advantageous to employ a sufficient amount of barium that the silicate resulting from the furnace treatment will be in the form of the tribarium silicate.

While in the foregoing disclosure reference has been made to specific materials and to specific proportions, and temperatures, it will be understood that the invention is not limited to those precise details of procedure but that such variations may be made therein as will be dictated by convenience or by the characteristics of the raw materials and the product desired, all without departing from the spirit of this invention. It is to be distinctly understood, therefore, that the invention is not limited to the precise details of the foregoing disclosure but that such variations or modifications, and the use of such individual features and subcombinations of features, as present themselves to those skilled in the art without departing from the spirit of this invention, are, although not specifically described herein, contemplated by and within the scope of the appended claims.

Having thus described the invention, what is claimed is:

1. In the art of making barium compounds, the process comprising, fusing together barium sulphate, alumina and silica in proportions such that the barium oxide content of the barium sulphate is substantially three molecules of barium oxide to each molecule of silica and three molecules of barium oxide to each molecule of alumina so as to obtain substantially sulfur free tribarium silica aluminate.

2. In the art of making barium compounds, the process comprising, fusing together barium sulphate, alumina and silica in proportions such that the barium oxide content of the barium sulphate is substantially three molecules of barium oxide to each molecule of silica and three molecules of barium oxide to each molecule of alumina at a temperature of 2600–3000° F. until the sulphur is substantially eliminated from the charge.

3. In the art of making barium hydroxide, the process comprising, fusing together barium sulphate, alumina and silica in proportions such that the barium oxide content of the barium sulphate is substantially three molecules of barium oxide to each molecule of silica and three molecules of barium oxide to each molecule of alumina at a temperature of 2600–3000° F. until the sulphur is substantially eliminated from the charge, treating the resultant product with water to dissolve the water soluble components, separating the liquor, evaporating the liquor heating residue in the presence of carbon, and treating the resultant product with water.

4. In the art of making barium compounds, the process comprising, fusing together barium sulphate, alumina and silica in proportions such that the barium oxide content of the barium sulphate is substantially three molecules of barium oxide to each molecule of silica and three molecules of barium oxide to each molecule of alumina at a temperature of 2600–3000° F. until the sulphur is substantially eliminated from the charge, treating the resultant product with water to dissolve the water soluble components, dissolving the undissolved components in dilute hydrochloric acid, treating the solution with ammonia in an amount sufficient to produce a precipitate, separating the precipitate, evaporating the liquor, mixing the residium with carbon, and exposing the mixture to a reducing flame at a temperature of at least 600° F.

5. In the art of making barium compounds, the process comprising, fusing together barium sulphate, alumina and silica in proportions such that the barium oxide content of the barium sulphate is substantially three molecules of barium oxide to each molecule of silica and three molecules of barium oxide to each molecule of alumina at a temperature of 2600–3000° F. until the sulphur is substantially eliminated from the charge, treating the resultant product with water to dissolve the water soluble components, and dissolving the undissolved components in dilute hydrochloric acid.

6. In the art of making barium compounds, the process comprising, fusing together barium sulphate, alumina and silica in proportions such that the barium oxide content of the barium sulphate is substantially three molecules of barium oxide to each molecule of silica and three molecules of barium oxide to each molecule of alumina at a temperature of 2600–3000° F. until the sulphur is substantially eliminated from the charge, treating the resultant product with water to dissolve the water soluble components, evaporating the solution, and heating the residue with carbon at 600–1400° F.

7. In the art of making barium compounds, the process comprising, fusing together barium sulphate, alumina and silica in proportions such that the barium oxide content of the barium sulphate is substantially three molecules of barium oxide to each molecule of silica and three molecules of barium oxide to each molecule of alumina at a temperature of 2600–3000° F. until the sulphur is substantially eliminated from the charge, treating the resultant product with water to dissolve the water soluble components, separating the insoluble components, evaporating the liquor, heating the residue from the evaporation in the presence of carbon, treating the separated insoluble components with hydrochloric acid, recovering the resultant barium chloride, mixing the barium chloride with carbon, and exposing the barium chloride to a reducing flame at a temperature of at least 600° F.

8. In the art of making barium compounds, the process comprising, fusing together barium sulphate, alumina and silica in proportions such that the barium oxide content of the barium sulphate is substantially three molecules of barium oxide to each molecule of silica and three molecules of barium oxide to each molecule of alumina at a temperature of 2600–3000° F. until the sulphur is substantially eliminated from the charge, treating the resultant product with water to dissolve the water soluble components, separating the insoluble components, treating the separated insoluble components with hydrochloric acid, and heating the resultant product with carbon at a temperature of about 2200° F.

9. In the art of making barium compounds, the process comprising, mixing together a barium ore and an alumina ore, one of said ores having a high silica content, in such proportions that the barium oxide content of the barium sulphate is substantially three molecules of barium oxide to each molecule of silica and three molecules of barium oxide to each molecule of alumina, and fusing the mixture at a temperature of 2600–3000° F. until the sulphur is substantially eliminated from the charge.

10. In the art of making barium compounds, the process comprising, mixing together a barium ore and an alumina ore, said barium ore having a high silica content, in such proportions that the barium oxide content of the barium sulphate is substantially three molecules of barium oxide to each molecule of silica and three molecules of barium oxide to each molecule of alumina, and fusing the mixture at a temperature of 2600–3000° F. until the sulphur is substantially eliminated from the charge.

11. In the art of making barium compounds, the process comprising, mixing together a barium ore and an alumina ore, said alumina ore having a high silica content, in such proportions that the barium oxide content of the barium sulphate is substantially three molecules of barium oxide to each molecule of silica and three molecules of barium oxide to each molecule of alumina, and fusing the mixture at a temperature of 2600–3000° F. until the sulphur is substantially eliminated from the charge.

12. In the art of making barium compounds, the process comprising, providing a solution containing dissolved oxy compounds of barium, with aluminum and silicon, evaporating the solution, heating the residue in the presence of carbon at a temperature of 600–1400° F., redigesting the product with water, and separating the insoluble alumina and silica.

ELBERT E. FISHER.